May 11, 1948. C. ROMAN 2,441,169
MACHINE FOR FORMING ARTIFICIAL BOARD
Filed June 19, 1943
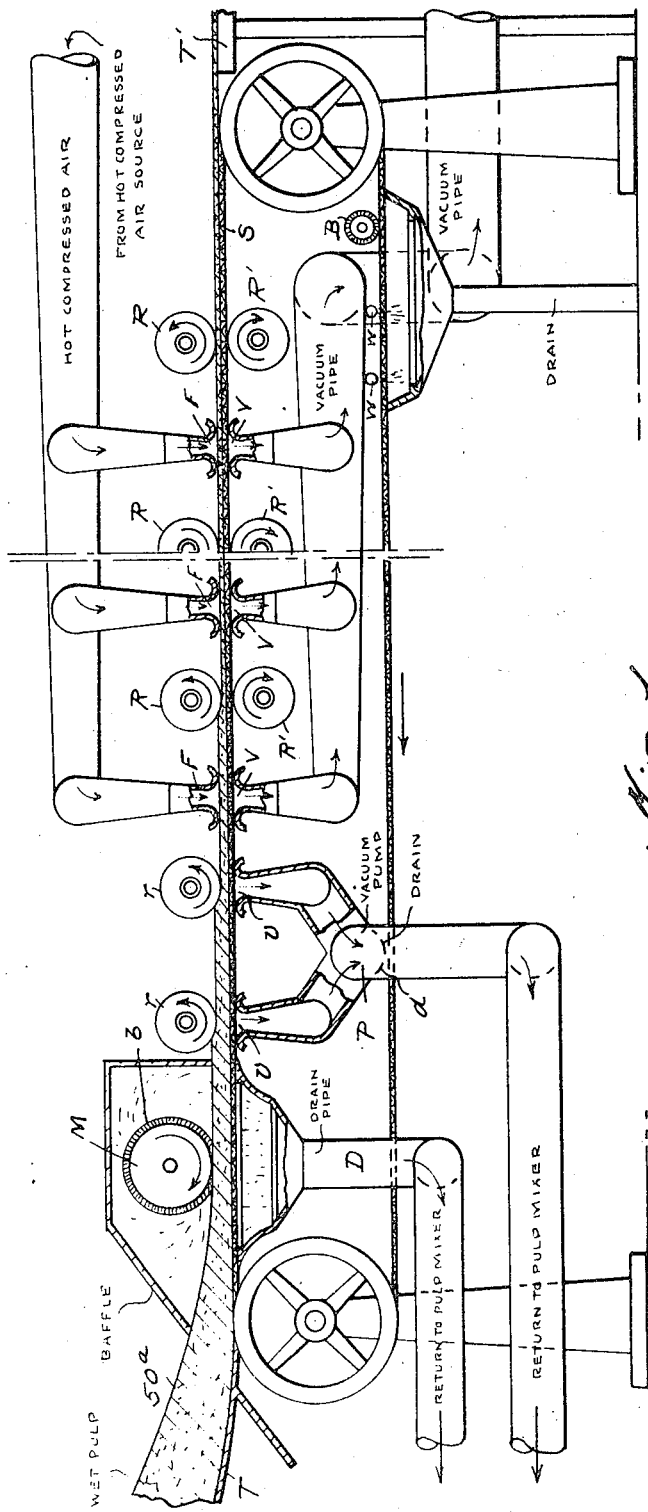
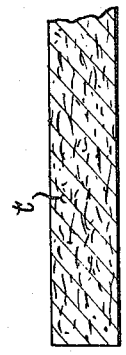
Fig. 3.
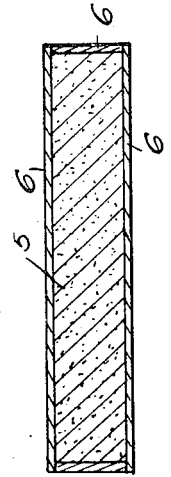
Fig. 2.
Fig. 1.
INVENTOR.
CHARLES ROMAN,
BY Shepherd & Campbell
Attorneys Patented May 11, 1948

2,441,169

UNITED STATES PATENT OFFICE 2,441,169

MACHINE FOR FORMING ARTIFICIAL BOARD

Charles Roman, Miami, Fla.

Application June 19, 1943, Serial No. 491,546

5 Claims. (Cl. 92—38)

The object of the invention is to provide an improved artificial board or lamina and a method of and machine for making the same.

I am aware of the fact that it is common practice to make many kinds of composition board by impregnating granular or fibrous cellulosic materials with a binder and subjecting the resultant dough to heat and pressure. However, the present invention goes far beyond this old basic thought and introduces certain refinements of manufacturing technique by virtue of which an improved product is had and in a substantially continuous operation.

In the accompanying drawing:

Fig. 1 is a diagrammatic view partly in elevation and partly in section, of a machine embodying one form of the invention.

Fig. 2 is a sectional view of one form of product which may be had by the use of core board manufactured upon said machine, and Fig. 3 is a vertical sectional view of another form of the product.

The machine of the present invention carries out a continuous process in accordance with the schematic illustration in Fig. 1 wherein wet dough 50a made of sawdust, wood pulp or other cellulose bearing material and a suitable binder is passed downwardly over the inclined table T on to the moving endless foraminous screen conveyor. In fact, the material employed need not be cellulose, though cellulose material is preferred. However, comminuted asbestos fibre or rock wool is not excluded. The dough upon the moving screen is first subjected to the action of macerated roller M having bristles $b$ thereon. The roller M cuts or throws back surplus dough, allowing only a predetermined amount of dough to pass under it. Excess liquid passes through the screen into drain pipe D and is returned to the pulp mixer. After the continuously moving sheet passes beneath the roller M, it is subjected to the action of pressure rollers $r$ which act to squeeze out liquid from the moving pulp. The rollers $r$ may be heated or not, as preferred, and they may be in any desired number. These rollers cooperate with corresponding vacuum slits $v$ located directly therebeneath which suck moisture from the dough through vacuum pump P, to drain $d$ from whence it is returned to the pulp mixer.

The moving wet pulp sheet is then subjected to the action of hot compressed air from pressure slit F located directly above the moving pulp sheet and vacuum slit V located below the moving sheet and in alignment with pressure slit F. The moving sheet is then subjected to one or more heated pressure rollers R and R'. Several sets of pressure and vacuum slits F and V, and rollers R and R' are alternately included in the schematic illustration of Fig. 1 whereby it is possible to complete the fabrication of the composition sheet lamina, that is, form and dry it in a comparatively short time. The finished continuous fibrous lamina which is of predetermined physical characteristics with regard to resiliency, heat and sound insulating capacities, thickness and weight is then passed from the endless moving conveyor S to the table T' from whence it may be passed to the laminating department of the plant for fabrication into construction units. To keep the continuously moving foraminous screen S clean, water sprayers $w$ and brush B are associated with the return side of the screen S in cooperating relationship therewith. Referring to the drawing it will be seen that after passing the first pressure roller $r$ the web has been compressed to a reduced thickness and that after passing the second roller $r$ its thickness has been still further reduced and the sheet has been greatly condensed. The mouths of the hot air ducts F and vacuum ducts V are outwardly rounded to permit said ducts to directly engage with the sheet, as shown, as the sheet rides between the hot air ducts, upon one side, and vacuum ducts upon the other. Thus the vacuum acts to facilitate the flow of the hot air through the sheet and brings about the quick drying and setting which is an important object of my machine.

Not only may a cellulose substance be used as the body of the dough, but a mineral, such as magnesite, is also adapted for similar utilization when the characteristics of that material are desired in the finished product. The finished composition sheet has been found to have all the desirable properties of wood and, in addition, it is non-absorbtive and thereby avoids warping such as occurs when wood absorbs moisture. In fact, the machine may handle many sorts of granular and fibrous substances when mixed into a dough with a suitable binder, and I wish it to be understood that I am not limited to any specific material or binder. I contemplate the use of fibres of any nature. I may fluff asbestos or use mineral wool, bagasse, and wood fibres from tree bark down to sawdust.

One form of binder which I have found to be very satisfactory is the binder of my prior U. S. Patent 2,181,439. However, I also contemplate the use of commercial urea formaldehyde diluted with water to the extent necessary to get the desired end result which may vary according to the density or porosity of the finished product. Urea formaldehyde is highly resistant to moisture and yields a product especially desirable in humid climates or for certain lines of manufacture, such as in fine furniture where veneer is largely used.

In Fig. 2 I have indicated at 5 a core piece made according to the present invention, and at 6 I have shown wood veneer glued to the exposed faces of core 5. A product such as is illustrated in Fig. 2 produces a product having all the beauty of the most expensive natural woods, and it may be successfully employed in the manufacture of furniture of the highest grade without fear that the veneer will crack or peel off.

As far as I am aware, I am the first to make an artificial core piece of comminuted wood fibres and a binder, which core piece is of such composition as to be impervious to moisture and of such density that its faces may be sanded to such trueness that veneer may be successfully applied thereto and with the certainty that it will never peel off.

By properly balancing the hot compressed air entering through slits or nozzles F with the degree of vacuum existing at slits or nozzles V the characteristics of the board may be varied within wide ranges. Where the temperature of the air is high and its pressure low and the degree of vacuum low the binder hardens at the surface of the board before it does at the center and we have a "case hardened" product with a porous and softer inner core. By lowering the temperature of the incoming air, and increasing its pressure and the degree of vacuum, the air travels faster through the composition board and the center becomes as hard and dense as the surface portions and the whole board becomes more dense. There are uses where porosity and softness in the interior of the board are of advantage; as, for example, where insulating properties are desirable. Most composition board having such porosity as to render it of insulating value is also of such softness as not to lend itself to the accurate surface machining or sanding necessary where veneer is to be applied. An absolutely true surface upon a moisture resistant core or base is a prerequisite to the production of a veneered product which will not shed its veneer under humid atmospheric conditions. I wish to emphasize the high degree of efficiency which arises from the arrangement shown and described and comprising the travelling bed for supporting a web of plastic dough, together with the plurality of opposed pressure and vacuum ducts spaced along said web, said web travelling between and being contacted by the confronting ends of said pressure and vacuum ducts, said ducts extending across the width of the web and being relatively narrow, the mouths of said ducts at their point of engagement with the web being rounded to provide non-tearing pressure points bearing upon the web, the pressure and vacuum ducts being arranged in pairs with a pressure duct opposed to a vacuum duct at a plurality of spaced points along the web, the distance between the confronting mouths of some of the ducts of the pairs becoming successively less in the direction of travel of the web, whereby the web is increasingly condensed as it travels past successive pairs of such ducts.

In Fig. 3 I have illustrated a core or board t of a very light and very porous nature. This I accomplish by impregnating coarse wood fibres, such as shavings with either of the binders described. In some cases I have reused the waste binder material drawn off at the vacuum nozzles to make a cheap board of high insulating value, such as in Fig. 3. I have found that passing the binder and hot air through the web of dough on the machine causes the extraction of certain substances, such as tannic acid from the wood fibres, and the reused binder is found to have improved binder characteristics as a result. The use of a machine such as is herein described eliminates the necessity for drying ovens, the board being dried or cured right in the machine. Since the machine may be made of any desired length, it follows that boards of considerable length may be made thereon. I intend to follow any of the steps or practices set forth in my Patent 2,181,439, wherever the same may be found applicable in conjunction with the operation of the machine of this invention or in the production of a veneered unit such as is illustrated in Fig. 2. By case hardening the board in a continuous operation and directly upon the machine the necessity for employing hot plates to press the board as described in my prior patent is avoided. Consequently, the core board may be turned out very rapidly, but will still be capable of yielding the flat and true surface required for veneering. For convenience in reference it may be stated that the binder of my prior patent is described in that patent as follows:

"A suitable binder may be made from the following materials and the proportions indicated have been found to be effective. To five gallons of water in a suitable container are added eight ounces of powdered animal glue. A compound is then prepared consisting of approximately 19 parts of sodium chloride, 75 parts of sodium bisulphate and 6 parts of silicate of magnesium. The main purpose of the silicate of magnesium is to prevent the sodium chloride and the sodium bisulphate from caking from being stored for some time. Three ounces of this compound is then added to the glue and water solution previously prepared and the whole mass heated to the boiling point.

"A starch is then made by adding a little cold water to four pounds of tapioca flour, sago flour, potato or other starch. Only enough water is added to the flour to make a soft paste. This paste is then added slowly to the boiling solution of water, glue and the compound mentioned above. As the starch paste is added to the solution the whole becomes at first a thick mass. As this is further stirred and boiled the reaction of the compound reduces the whole mass to an easy flowing thin fluid. The batch thus formed is then removed from the heat and allowed to cool slightly, after which is added one fluid ounce of paraformaldehyde. The binder is then ready for use.

"A good binder may be made without the use of the animal glue. The small amount of the animal glue, however, seems to help the paraformaldehyde to mix with the starch and imparts a smooth or creamy feel to the binder."

The invention includes within its purview whatever changes fairly come within either the terms or the spirit of the appended claims.

Having described my invention, what I claim is:

1. A machine of the character described comprising a traveling bed for supporting a plastic dough web of a comminuted material and a binder thereon, a plurality of opposed pressure and vacuum ducts spaced along said web, said web traveling between and being contacted by the confronting ends of said pressure and vacuum ducts, said ducts extending across the width of said web and being relatively narrow, the mouths of said ducts at their points of engagement with the web being rounded to provide non-tearing pressure points bearing upon the web, said pressure and vacuum ducts being arranged in pairs with a pressure duct opposed to a vacuum duct at a plurality of spaced points along the web, the distance between the confronting mouths of some of the ducts of the pairs becoming successively less in the direction of travel of the web, whereby the web is increasingly condensed as it travels past successive pairs of such ducts.

2. A structure as recited in claim 1 wherein the bed is a foraminous one.

3. A structure as recited in claim 1, in combination with means for heating the web at a point between two of the pairs of ducts.

4. A machine of the character described comprising a traveling bed of screen like material, means for feeding of plastic dough web of a comminuted material and a binder, of uniform thickness thereon and a plurality of pairs of opposed vacuum and pressure ducts disposed at spaced intervals along said web, the vacuum ducts being upon an opposite side of the web from the pressure ducts, the length of the ducts extending laterally of the line of travel of the web, said ducts being relatively narrow and having side walls which, at their web engaging ends are curved outwardly and upwardly to provide a tight and non-tearing engagement between the ducts and web.

5. A machine of the character described comprising a travelling bed for supporting a dough web of a comminuted material and a binder thereon, a plurality of opposed pressure and vacuum ducts spaced along said web, said web travelling between and being contacted by the confronting ends of said pressure and vacuum ducts, said ducts extending across the width of said web and being relatively narrow, the mouths of said ducts at their points of engagement with the web being rounded to provide non-tearing pressure points bearing upon the web, said pressure and vacuum ducts being arranged in pairs with a pressure duct opposed to a vacuum duct at a plurality of spaced points along the web, the distance between the confronting mouths of some of the ducts of the pairs becoming successively less in the direction of travel of the web, whereby the web is increasingly condensed as it travels past successive pairs of such ducts, and a pair of heated rolls between which the web and bed pass at a point between two of the pairs of vacuum and pressure ducts.

CHARLES ROMAN.

REFERENCES CITED

The following references are of record in the file of this patent:

UNITED STATES PATENTS

| Number | Name | Date |
|---|---|---|
| 279,114 | Adams | June 12, 1883 |
| 829,677 | Sillman | Aug. 28, 1906 |
| 947,508 | Wright | Jan. 25, 1910 |
| 1,375,663 | Ainsworth | Apr. 26, 1921 |
| 1,438,511 | Witham | Dec. 12, 1922 |
| 1,599,503 | Tompkins | Sept. 14, 1926 |
| 1,656,766 | Valentine | Jan. 17, 1928 |
| 1,748,224 | Hinde | Feb. 25, 1930 |
| 1,754,370 | Raynes | Apr. 15, 1930 |
| 1,767,889 | Jurgensen | June 24, 1930 |
| 1,787,047 | Loetscher | Dec. 30, 1930 |
| 1,821,209 | Darrah | Sept. 1, 1931 |
| 1,843,656 | Tompkins et al. | Feb. 2, 1932 |
| 1,881,404 | Hadley | Oct. 4, 1932 |
| 1,907,046 | Darrah | May 2, 1933 |
| 1,988,243 | Loetscher | Apr. 30, 1935 |
| 2,033,124 | Devereux | Mar. 10, 1936 |
| 2,336,628 | Muench | Dec. 14, 1943 |
| 2,356,244 | Johnson | Aug. 22, 1944 |

FOREIGN PATENTS

| Number | Country | Date |
|---|---|---|
| 1,057 | Great Britain | 1861 |